United States Patent
Eisenbarth et al.

(10) Patent No.: US 10,976,426 B2
(45) Date of Patent: Apr. 13, 2021

(54) APPARATUS AND METHOD FOR ASCERTAINING OBJECT KINEMATICS OF A MOVABLE OBJECT

(71) Applicant: Conti Temic microelectronic GmbH, Nuremberg (DE)

(72) Inventors: Andreas Eisenbarth, Hergatz (DE); Yang Zhang, Friedrichshafen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 276 days.

(21) Appl. No.: 16/090,472

(22) PCT Filed: Apr. 18, 2017

(86) PCT No.: PCT/DE2017/200034
§ 371 (c)(1),
(2) Date: Oct. 1, 2018

(87) PCT Pub. No.: WO2017/182041
PCT Pub. Date: Oct. 26, 2017

(65) Prior Publication Data
US 2019/0113612 A1  Apr. 18, 2019

(30) Foreign Application Priority Data
Apr. 19, 2016   (DE) ...................... 10 2016 206 550.5

(51) Int. Cl.
*G08G 1/16*    (2006.01)
*G01S 13/72*   (2006.01)
(Continued)

(52) U.S. Cl.
CPC ............ *G01S 13/726* (2013.01); *G01S 13/72* (2013.01); *G01S 13/931* (2013.01);
(Continued)

(58) Field of Classification Search
CPC ...... B60W 10/00; B60W 40/04; B60W 40/06; B60W 2420/40; B60W 2420/52;
(Continued)

(56) References Cited

U.S. PATENT DOCUMENTS 5,008,678 A * 4/1991 Herman ................... G01S 13/87
                                                                342/158
5,302,956 A * 4/1994 Asbury ................ G01S 13/325
                                                                342/70

(Continued)

FOREIGN PATENT DOCUMENTS

DE         698 29 946       5/2006
DE       102006057276       6/2008
(Continued)

OTHER PUBLICATIONS

English translation of the International Search Report of the International Searching Authority for International Application PCT/DE2017/200034, dated Jul. 21, 2017, 3 pages, European Patent Office, HV Rijswijk, Netherlands.
(Continued)

*Primary Examiner* — Yonel Beaulieu
(74) *Attorney, Agent, or Firm* — W. F. Fasse

(57) ABSTRACT

An apparatus and a method for ascertaining object kinematics of a movable object include: a trajectory calculation filter for calculating an estimated movement direction of the object based on a predicted position of the object and based on a position of the object specified in radar measurement data of the object; and a calculation unit for calculating Cartesian speeds of the object depending on a measured radial object speed and a measured object angle, which are specified in the radar measurement data, and depending on the estimated movement direction of the object that is calculated in the trajectory calculation filter.

15 Claims, 5 Drawing Sheets

(51) Int. Cl.
| | |
|---|---|
| *G01S 13/02* | (2006.01) |
| *G01S 13/04* | (2006.01) |
| *G01S 13/06* | (2006.01) |
| *B60W 40/00* | (2006.01) |
| *B60W 40/04* | (2006.01) |
| *G01S 13/931* | (2020.01) |
| *G01S 13/933* | (2020.01) |
| *G01S 13/937* | (2020.01) |
| *G08G 1/00* | (2006.01) |

(52) U.S. Cl.
CPC .......... *G01S 13/933* (2020.01); *G01S 13/937* (2020.01); *G01S 2013/9322* (2020.01); *G08G 1/00* (2013.01); *G08G 1/16* (2013.01)

(58) Field of Classification Search
CPC . B60W 5/00; B60W 5/006; G01S 2013/9325; G01S 2013/9322; G01S 13/726; G01S 13/937; G01S 13/933; G01S 13/72; G01S 13/931; G01S 13/91; G01S 17/00; G01S 17/88; G01S 17/93; G01S 17/931; G01S 17/933; G08G 1/00; G08G 1/16
See application file for complete search history.

(56) References Cited

U.S. PATENT DOCUMENTS

| | | | | |
|---|---|---|---|---|
| 5,471,214 | A | 11/1995 | Faibish et al. | |
| 6,065,151 | A | 7/2000 | Farmer et al. | |
| 6,784,828 | B2* | 8/2004 | Delcheccolo | G01S 7/354 342/70 |
| 6,864,831 | B2* | 3/2005 | Woodington | H01Q 13/10 342/70 |
| 7,071,868 | B2* | 7/2006 | Woodington | G01S 13/04 342/70 |
| 7,684,590 | B2 | 3/2010 | Kaempchen et al. | |
| 8,140,210 | B2 | 3/2012 | Randler et al. | |
| 8,352,173 | B2* | 1/2013 | Greene | G08G 1/166 701/301 |
| 9,250,324 | B2* | 2/2016 | Zeng | G01S 7/40 |
| 9,482,751 | B2* | 11/2016 | Mandava | B60Q 9/008 |
| 9,831,881 | B2* | 11/2017 | Josefsberg | H03L 7/085 |
| 9,983,306 | B2* | 5/2018 | Zeng | G01S 7/41 |
| 10,205,457 | B1* | 2/2019 | Josefsberg | H03L 7/091 |
| 10,404,261 | B1* | 9/2019 | Josefsberg | H03L 7/091 |
| 2010/0103026 | A1 | 4/2010 | Kim et al. | |
| 2012/0306686 | A1* | 12/2012 | Millet | G01S 13/72 342/175 |

FOREIGN PATENT DOCUMENTS

| | | |
|---|---|---|
| DE | 102013018751 | 5/2015 |
| JP | 10-206535 A | 8/1908 |
| JP | 09-090026 A | 4/1997 |
| JP | 2001-099925 A | 4/2001 |
| JP | 2005-310140 A | 11/2005 |
| WO | WO 98/32030 | 7/1998 |

OTHER PUBLICATIONS

English translation of PCT International Preliminary Report on Patentability of the International Searching Authority for International Application PCT/DE2017/200034, dated Jul. 24, 2018, 6 pages, European Patent Office, Munich, Germany.

German Search Report for German Patent Application No. 10 2016 206 550.5, dated Dec. 19, 2016, 9 pages, German Patent and Trademark Office, Muenchen, Germany, with partial English translation, 7 pages.

Manolis Tsogas et al., "Unscented Kalman Filter Design for Curvilinear Motion Models Suitable for Automotive Safety Applications", 2005 7$^{th}$ International Conference on Information Fusion (FUSION), Jul. 25, 2005, XP010892372, ISBN: 978-0-7803-9286-1, pp. 1295 to 1302.

Luigi Glielmo et al., "An Interlaced Extended Kalman Filter", IEEE Transactions on Automatic Control, vol. 44, No. 8, Aug. 1, 1999, XP011001020, ISSN: 0018-9286, pp. 1546 to 1549.

English Partial Summary of Japanese Office Action in Japanese Patent Application No. 2018-554527, dated Dec. 9, 2020, 5 pages.

* cited by examiner

APPARATUS AND METHOD FOR ASCERTAINING OBJECT KINEMATICS OF A MOVABLE OBJECT

FIELD OF THE INVENTION

The invention relates to an apparatus and method for ascertaining object kinematics of a movable object, in particular of a movable vehicle.

BACKGROUND INFORMATION

Road vehicles increasingly have radar sensors for detecting their vehicle surroundings. A radar tracking system establishes a track of a movable object from measuring points of previous scanning cycles. Such tracks describe the previous path of an object and consequently make it possible to observe the way it is moving, i.e. the current position thereof, the speed thereof and the movement direction thereof. Radar sensors cannot directly measure the Cartesian speed of an object in the trajectory direction, but measure a relative radial Doppler speed between the real physical object and the radar sensor. In most radar tracking system applications, the Cartesian position and speed, especially, and sometimes also the acceleration of an object, which are estimated as conditions in a tracking filter, are relevant. If the radar raw measurement data of a radar measurement device are used as measurement data for the tracking filter, it is not possible to avoid a strongly correlated, non-linear conversion or respectively transformation of said raw measurement data or respectively raw measurements into estimated conditions having Cartesian variables. This, in turn, leads to complex linearizations and elaborate calculations by a calculation or respectively transformation unit which is required for this purpose. In addition, the reaction time of the radar tracking system is increased by the elaborate calculations.

SUMMARY OF THE INVENTION

It is therefore an object of the present invention to create an apparatus for ascertaining object kinematics of a movable object, in which the calculation time required for this purpose is reduced compared with conventional systems.

This object can be achieved according to the invention by an apparatus, a method, a radar tracking system, a driver assistance system, and a traffic monitoring system, respectively having the features specified herein.

The invention accordingly creates an apparatus for ascertaining object kinematics of a movable object, comprising: a trajectory calculation filter for calculating an estimated movement direction of the object on the basis of a predicted position of the object and on the basis of the position of the object specified in radar measurement data of the object; and comprising
a calculation unit for calculating Cartesian speeds of the radar raw measurements depending on a measured radial speed and a measured angle, which are specified in the radar measurement data of the object, and depending on the estimated movement direction of the tracked object that is calculated in the trajectory calculation filter.

In one possible embodiment of the apparatus according to the invention, the latter has a linear tracking filter which calculates a Cartesian position, speed and/or an acceleration of the object iteratively depending on the Cartesian kinematics of the object that have previously been calculated by the calculation unit and the kinematics of the object specified in the radar measurement data.

In a further possible embodiment of the apparatus according to the invention, said apparatus has a JPDA filter which, depending on the position and the speed of the object that are iteratively calculated in the linear tracking filter, associates radar measurement data detected by sensors in order to ascertain the radar measurement data of the relevant object.

In a further possible embodiment of the apparatus according to the invention, the position, speed and/or acceleration of the object that are calculated in the linear tracking filter are output to an evaluation unit of a driver assistance system.

In one possible embodiment of the apparatus according to the invention, the trajectory calculation filter is a Kalman filter.

In a further possible embodiment of the apparatus according to the invention, the trajectory calculation filter is a lowpass filter.

According to another aspect, the invention provides a method for ascertaining object kinematics of a movable object, having the steps of: calculating an estimated movement direction of the object on the basis of a predicted position of the object and on the basis of the position of the object specified in radar measurement data detected by sensors, and
calculating Cartesian kinematics of the object depending on the measured radial speed and a measured angle of the object, which are specified in the radar measurement data of the object, and depending on the estimated movement direction of the object that is calculated.

In one possible embodiment of the method according to the invention, a Cartesian position, speed and/or an acceleration of the object are iteratively calculated depending on the predicted kinematics of the object and the Cartesian radar raw measurement kinematics which are determined by the movement direction estimate as well as the polar raw kinematics.

In a further possible embodiment of the method according to the invention, depending on the predicted position and the predicted speed of the object that are iteratively calculated in the linear tracking filter, radar measurement data detected by sensors are associated in order to ascertain the radar measurement data of the relevant object.

In a further possible embodiment of the method according to the invention, the calculated position, speed and/or acceleration of the object are evaluated by an evaluation unit of a driver assistance system in order to provide driver assistance functions.

According to a further aspect, the invention provides a radar tracking system, having an apparatus for ascertaining object kinematics of a movable object, in particular in the surroundings of the radar tracking system, comprising:
a trajectory calculation filter for calculating an estimated movement direction of the object on the basis of a predicted position of the object and on the basis of the position of the object specified in radar measurement data of the object, and comprising
a calculation unit for calculating Cartesian speeds of the radar raw measurements depending on the measured radial object speed and a measured object angle, which are specified in the radar measurement data of the object, and depending on the estimated movement direction of the object that is calculated in the trajectory calculation filter.

According to still another aspect, the invention provides a driver assistance system for a vehicle, wherein the driver assistance system has an evaluation unit which evaluates the position, speed and/or acceleration of an object, in particular of another vehicle in the surroundings of the vehicle, that are calculated by an apparatus for ascertaining object kinematics of a movable object according to the first aspect of the invention, in order to provide driver assistance functions for the driver of the vehicle in real time.

In one possible embodiment of the driver assistance system according to the invention, the system is configured to calculate the position, speed and acceleration of another vehicle located in the surroundings of the vehicle or another road user, in particular a passer-by.

In one possible embodiment of the vehicle according to the invention, the vehicle is a land vehicle or respectively road vehicle, in particular a car or a truck.

In a further possible embodiment of the vehicle according to the invention, the vehicle is an aircraft, in particular an airplane or a helicopter.

In a further possible embodiment of the vehicle according to the invention, the vehicle is a vessel, in particular a surface vessel or submersible vehicle.

According to a further aspect, the invention provides a traffic monitoring system for monitoring air traffic, maritime traffic or road traffic of objects within a monitoring area, comprising at least one apparatus according to the first aspect of the invention for ascertaining object kinematics of the movable objects located in the monitoring area, which is provided in the monitoring area.

BRIEF DESCRIPTION OF THE DRAWINGS

Possible embodiments of the various aspects of the invention are explained in greater detail below, with reference to the appended figures, wherein.

DETAILED DESCRIPTION OF EXAMPLE EMBODIMENTS OF THE INVENTION

Figure 1:
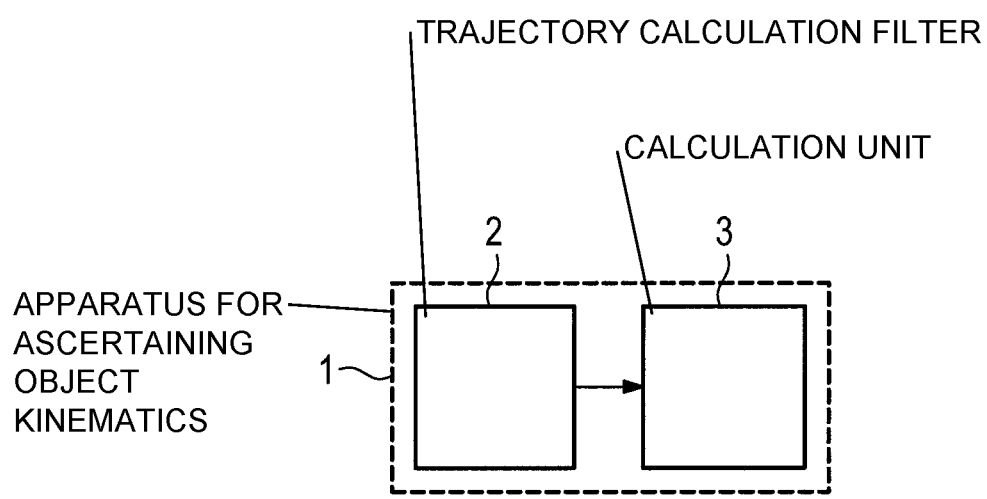
FIG. 1 shows a block diagram of a possible exemplary embodiment of an apparatus according to the invention for ascertaining object kinematics of a movable object according to a first aspect of the invention.

As can be seen from FIG. 1, an apparatus 1 according to the invention for ascertaining object kinematics of a movable object substantially has, in the represented embodiment example, two units, namely a trajectory calculation filter 2 and a calculation unit 3. The trajectory calculation filter or respectively heading filter 2 is provided in order to calculate an estimated movement direction or respectively an estimated trajectory of a movable object. In this case, the trajectory calculation filter 2 calculates the estimated movement direction of the movable object on the basis of a predicted position of the tracked object and on the basis of the current or respectively measured position of the object specified in radar measurement data of the object.

The calculation unit 3 of the apparatus 1 is provided in order to calculate Cartesian speeds of the radar raw measurements. The calculation unit 3 calculates the Cartesian speeds depending on the measured radial speed and a measured angle of the object, which are specified in the radar measurement data of the object, as well as depending on the estimated movement direction of the object that is calculated in the trajectory calculation filter 2. The trajectory calculation filter 2 of the apparatus 1 is, in one preferred embodiment, a Kalman filter. The Kalman filter evaluates a known current condition of an object or respectively target object, i.e. the position, movement direction and speed and, if applicable, the acceleration thereof, and uses these to predict a new condition of the target object at the time of the last radar measurement performed. During the execution of this forecast, the Kalman filter also renews an estimate of the error resulting during this or respectively an estimate of the uncertainty of a prediction or respectively forecast. The Kalman filter preferably filters a weighted average value of this condition forecast and of the last measurement of the respective condition that was performed, wherein it also considers the known measurement errors of the radar measurement unit as well as its inherent uncertainty on the basis of a target object movement model. The Kalman filter carries out an update of its estimate with regard to the uncertainty of the condition estimate. Consequently, the calculation by the Kalman filter substantially takes place in two sub-steps. The Kalman filter initially produces estimates of the current condition variables, together with the uncertainties or respectively variance thereof. As soon as the next measurement data are available, these estimates are updated or respectively renewed using a weighted average value, wherein a greater weight can be placed on estimated values having a higher certainty or respectively lower variance. In this case, the calculation is preferably carried out recursively in real time, wherein the currently available measurement data and the previously calculated condition as well as the uncertainty matrix thereof are used. The trajectory calculation filter 2 of the apparatus 1, which is represented in FIG. 1, can alternatively also be implemented by a low-pass filter. The trajectory calculation filter 2 calculates the estimated movement direction of the object. Since only the movement direction of the object is calculated or respectively estimated, these calculations can be performed very quickly in real time by the trajectory calculation filter 2.

The calculation unit 3 performs a calculation of the Cartesian speeds of the radar raw measurements depending on the estimated movement direction of the object that is calculated in the trajectory calculation filter 2 as well as further measurement data, which comprise the measured radial speed and the measured angle of the object, which are specified in the current radar measurement data which are supplied by a radar measurement unit.

Figure 2:
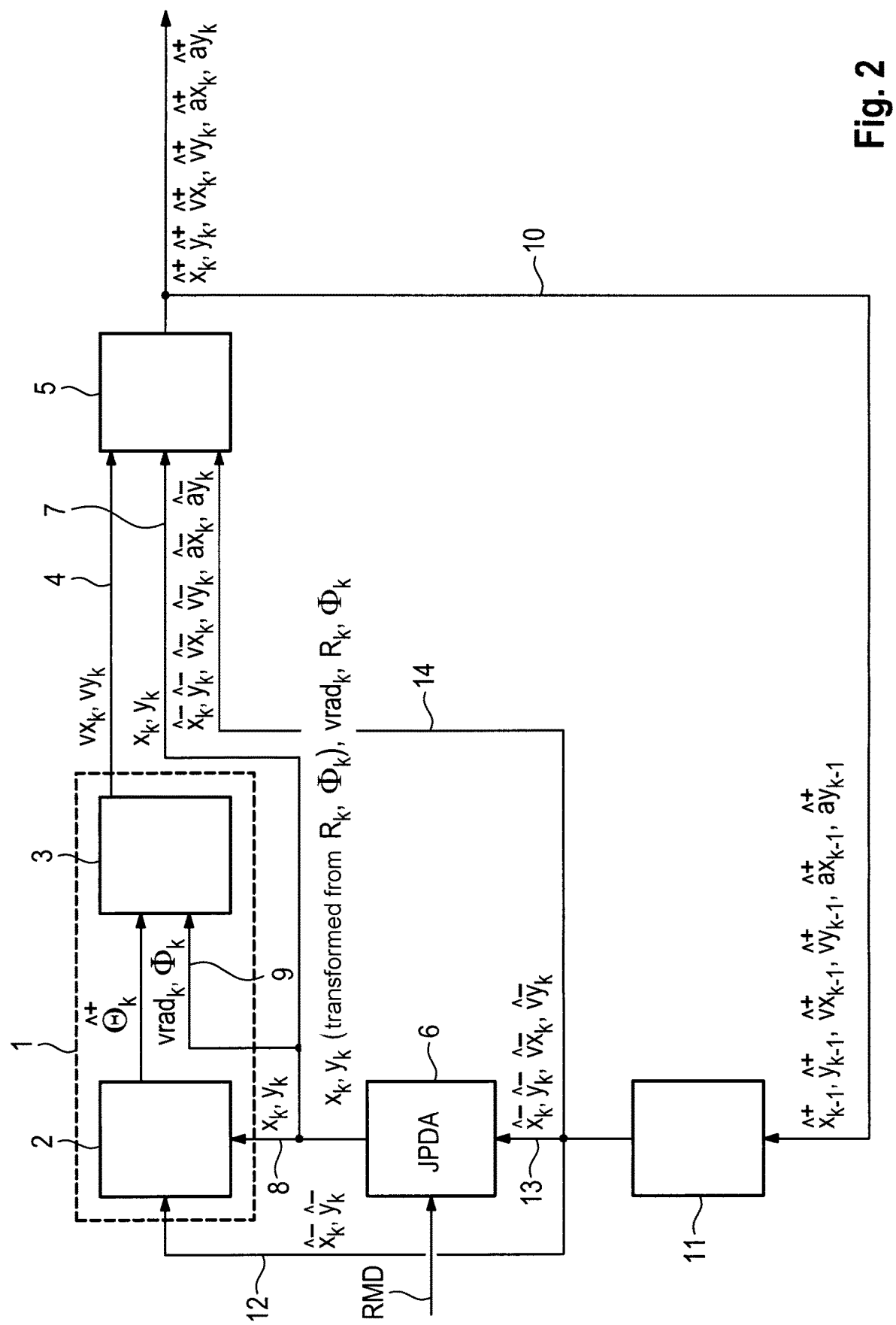
FIG. 2 shows a further block diagram in order to represent a possible embodiment of the apparatus according to the invention for ascertaining object kinematics of a movable object.

FIG. 2 shows, in the form of a block diagram, one possible embodiment example of a radar tracking system, in which the apparatus 1 according to the invention for ascertaining object kinematics of a movable object can be deployed. The apparatus 1 has a trajectory calculation filter 2 and a calculation unit 3. The calculation unit 3 calculates the Cartesian speeds of the raw measurements and delivers these by means of a wire 4 to a linear tracking filter 5 of the radar tracking system. The radar tracking system further has, in the represented embodiment, a JPDA (Joint Probabilistic Data Association) filter 6, which filters radar measurement data RMD detected by sensors in order to ascertain radar measurement data of the relevant object. In this case, the radar measurement data RMD of the relevant object include the current position of the object $x_K, y_K$. The linear tracking filter 5 calculates a Cartesian position, speed and an acceleration of the object or respectively target object iteratively depending on the Cartesian speeds of the raw measurements that are calculated by the calculation unit 3 and associated by JDPA and the object kinematics that are predicted in a predicting unit 11. The Cartesian positions of the associated radar measurement data RMD of the relevant object are emitted by the JPDA filter 6 by means of the signal wires 7 to the linear tracking filter 5, as represented in FIG. 2. The position of the object measured in the radar measurement data RMD is, in addition, emitted by the JPDA filter 6 by means of the wire 8 to the trajectory calculation filter 2 of the apparatus 1, as likewise represented in FIG. 2. Furthermore, the radar measurement data RMD of the object contain the measured radial speed and the measured angle of the object, which are supplied by the JPDA filter 6 by means of signal wires 9 to the calculation unit 3 of the apparatus 1. The JPDA filter 6 is connected on the input side to a radar measurement unit and includes all of the radar measurement data RMD of various objects in the surroundings of the radar tracking system. The JPDA filter 6 consequently associates radar measurement data RMD obtained with the associated movable objects in the surroundings which have already been tracked. Depending on the predicted position and the predicted speed of the object that are iteratively calculated by the predicting unit 11, the JPDA filter 6 filters radar measurement data RMD detected by sensors, which it obtains from the radar measurement unit, in order to ascertain radar measurement data of the relevant object or respectively target object. The kinematics, i.e. the position, speed and/or acceleration of the object that are updated by the linear tracking filter 5 can be output to an evaluation unit of a driver assistance system, which is connected in series. Moreover, the calculated object kinematics, which have the position, speed and/or acceleration of the movable object, are fed back in a recursive loop by means of a wire 10 to the prediction unit or respectively the prediction filter 11 for the next calculation cycle, as represented in FIG. 2. The prediction filter 11 predicts the values emitted to the linear tracking filter 5, wherein the trajectory calculation filter or respectively heading filter 2 obtains the predicted position of the object by means of a wire 12. The JPDA filter 6 obtains the predicted position and the predicted speed of the object from the prediction filter 11 by means of a wire 13. Furthermore, the linear tracking filter 5 obtains, by means of a wire 14, the predicted position, the predicted speed and/or the predicted acceleration of the object with respect to the last calculation cycle by means of the wire 14, so that a recursive calculation can be carried out. With the aid of the JPDA filter 6, the cluster measurements can be allocated to relevant tracked target objects. With the aid of the predicted position and position measurements, the movement direction or respectively the trajectory of the target object can be estimated. Based on the calculated trajectory or respectively the calculated movement direction, the Cartesian speeds are calculated by the calculation unit 3 on the basis of the measured radial object speed and the measured object angle. The calculated Cartesian speeds are used, together with the Cartesian position measurement data RMD of the relevant object, as normal Cartesian measurement input data for the linear tracking filter 5, which calculates the updated position, the updated speed and the updated acceleration of the object as well as the associated standard deviations as output variables. This means that nonlinear data transformations which are complex in calculation terms can be avoided, so that the necessary computing time is reduced. With the aid of the trajectory calculation filter or respectively heading filter 2, it is possible to transform the radar raw measurement data RMD, i.e. in particular range, angle and radial Doppler speed, into measurement data of a Cartesian coordinate system for the linear tracking filter 5. The updated data are fed back in a recursive calculation loop. This allows a constant comparison with current position measurements and helps to accurately estimate a standard deviation of the present trajectory of the object.

Figure 3:
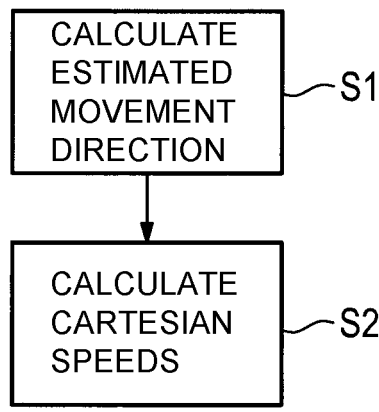
FIG. 3 shows a simple flow chart in order to represent one embodiment example of a method according to the invention for ascertaining object kinematics of a movable object.

FIG. 3 shows a flow chart in order to represent one embodiment example of the method according to the invention for ascertaining object kinematics of a movable object.

In a first step S1, an estimated movement direction of the object is calculated on the basis of a predicted position of the tracked object and on the basis of the position of the object specified in radar measurement data (RMD) detected by sensors.

In a further step S2, Cartesian speeds of the raw measurements are calculated depending on the measured radial speed and a measured angle of the object, which are specified in the radar measurement data RMD of the object, and depending on the estimated movement direction of the object that is calculated. The method according to the invention represented in FIG. 3 is preferably executed in real time by an apparatus of a radar tracking system.

Figure 4:
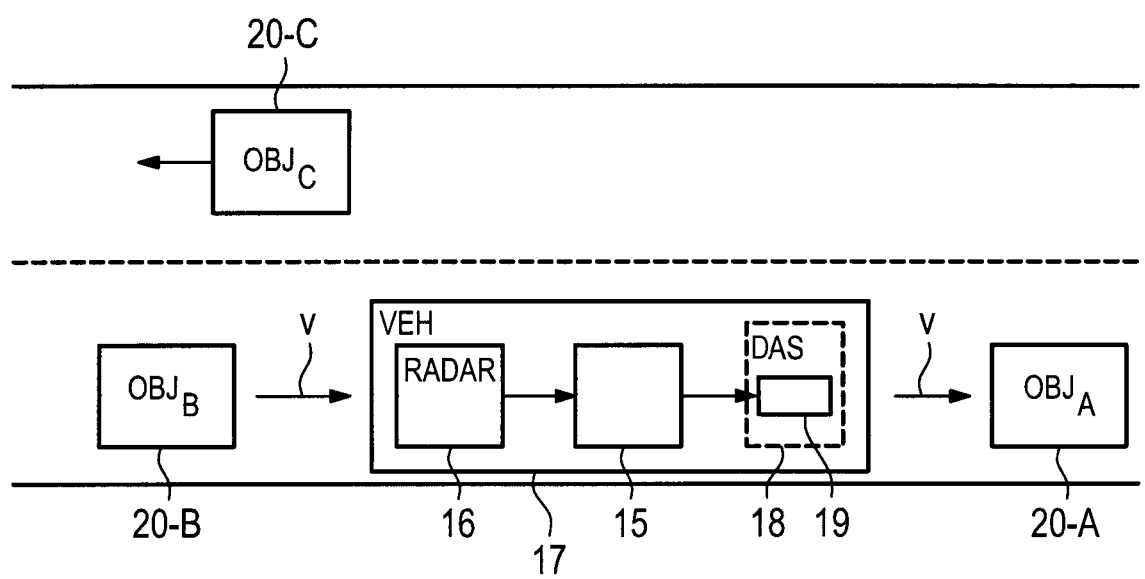
FIG. 4 shows a schematic representation of one exemplary application of the apparatus according to the invention and of the method according to the invention for ascertaining object kinematics of a movable object.

FIG. 4 schematically shows one exemplary application of the apparatus according to the invention and of the method according to the invention for ascertaining object kinematics of a movable object. In the embodiment example represented in FIG. 4, the apparatus 1 according to the invention and according to FIG. 1 forms part of a radar tracking system 15 which continuously obtains radar measurement data RMD from a radar measurement unit 16. The radar measurement unit 16 and the radar tracking system 15 are located, in the represented embodiment example, in the bodywork of a vehicle 17. This vehicle 17 has a driver assistance system 18. The driver assistance system 18 has an evaluation unit or respectively a data processing unit 19. The evaluation unit 19 continuously obtains output data from the radar tracking system 15, which output data are emitted by the linear tracking filter 5 of an apparatus 1 for ascertaining object kinematics of a movable object, which is contained in the radar tracking system 15. The linear tracking filter 5 of the apparatus 1 continuously and recursively calculates a position, a speed and/or an acceleration of an object in the surroundings of the vehicle 17 in real time. The evaluation unit 19 of the driver assistance system 18 evaluates the data emitted by the linear tracking filter 5, which comprise the position, the speed and/or the acceleration of one or more objects in the surroundings of the vehicle 17, in order to provide driver assistance functions for the driver of the vehicle 17 in real time. These driver assistance functions comprise, for example, steering operations in order to avoid collisions with other objects, in particular other vehicles. As represented in FIG. 4, the vehicle 17 is moving on a right lane of a road at a speed V, wherein a further vehicle object 20-A is located in front of the vehicle 17 as an object. Behind the vehicle 17, a second vehicle 20-B is moving in the same direction as object B. Moreover, a third object or respectively vehicle object 20-C is represented in FIG. 4, which is driving past the vehicle 17 on the opposite lane.

The apparatus 1 integrated into the radar tracking system 15 of the vehicle 17 is suitable for ascertaining object kinematics of various movable objects or respectively vehicles in the surroundings of the vehicle 17 and to provide these to an evaluation unit 19 of a driver assistance system 18 for further data evaluation. The objects can be any road users, for example vehicles or passers-by. The road vehicle 17 is preferably a car or a truck. Alternatively, the vehicle 17 can also be an aircraft or a vessel. The objects or respectively target objects can also be vehicles, for example aircraft, vessels or land vehicles. For example, the aircraft can be passenger jets or private airplanes, helicopters or drones. The object kinematics of the objects located in the surroundings of the vehicle 17 can be ascertained two-dimensionally or three-dimensionally. The calculated Cartesian speeds of the object therefore comprise at least two, preferably three, coordinates.

Figure 5A:
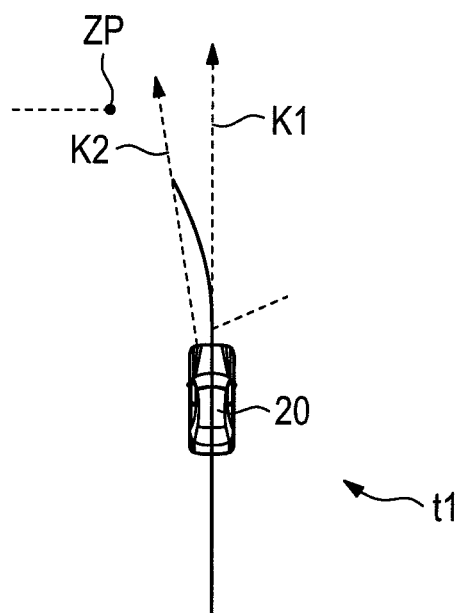
FIGS. 5A, 5B, 5C show schematic representations in order to explain the mode of operation of the apparatus according to the invention and of the method according to the invention for ascertaining object kinematics of a movable object.
Figure 5B:
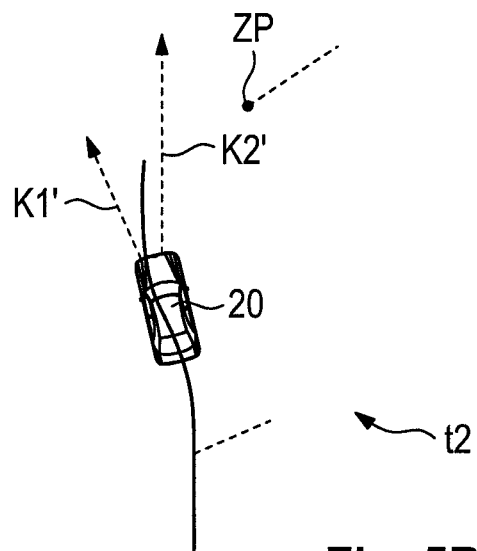
Figure 5C:
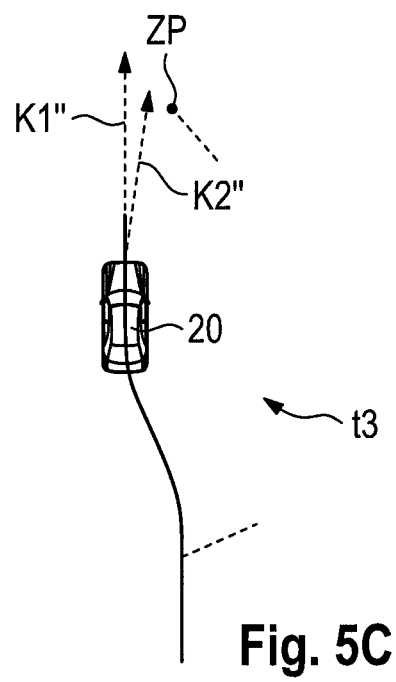

FIGS. 5A, 5B, 5C serve to explain the mode of operation of the apparatus 1 according to the invention and of the method according to the invention for ascertaining object kinematics of a movable object. At cycle time t1, a movable target object 20 is moving in a previous movement direction or respectively on a previous trajectory K1. The measured associated target position ZP is likewise represented in FIG. 5A. The lane on the basis of the corrected movement direction or respectively the corrected calculated trajectory K2 is represented in FIG. 5A. The lane of the object 20 is represented as a continuous line. The corrected trajectory K2 becomes the previous trajectory KV for the next calculation cycle t2 and is shown on the basis of the evaluated radar measurement data of the associated object 20, corrected again to a trajectory K2', as shown in FIG. 5B. Consequently, the track of the object 20 tends in the direction of the corrected trajectory K2', as represented in FIG. 5B. The corrected trajectory K2' becomes the previous trajectory K1" and a renewed correcting change is made to the trajectory K2" in accordance with the evaluated radar measurement data of the object 20 at cycle time t3, as represented in FIG. 5C. The trajectory calculation filter 2 consequently continuously ascertains, on the basis of a previous estimate and on the basis of new measurement data, a current trajectory of the target object. If the new position of the target object specified in the measurement data is not located in the previously estimated trajectory direction, the trajectory calculation filter or respectively heading filter 2 adjusts its estimate to the new measurement data and the previous estimate as well as the variance thereof. The trajectory calculation filter 2 is in a position to filter out a majority of the measurement noise (stability) and is further in a position to quickly adapt its estimate on the basis of the new or respectively last measurement data (flexibility). In one possible embodiment, the trajectory calculation filter 2 can be implemented by a low-pass filter. The output data of the trajectory calculation filter 2 can have the estimated movement direction of the target object 20 and the variance thereof. The low-pass filter, which serves as a trajectory calculation filter 2 in one possible embodiment, can be implemented in one possible embodiment as follows:

$\theta = f(V1, V2) \times \theta_{alt} + (1 - f(V1, V2)) \times \theta_{measured}$, wherein $\theta_{alt}$ represents the estimated movement direction of the last calculation cycle, $\theta_{measured}$ represents the measured movement direction of the object of the current calculation cycle, $f(V1, V2)$ represents a weighting function of the estimated and measured variances V1, V2 of the movement directions and $\theta$ represents the estimated movement direction of the object in the current calculation cycle.

The method according to the invention and the apparatus 1 according to the invention for ascertaining object kinematics can also be deployed for a traffic monitoring system. This traffic monitoring system serves to monitor air traffic, maritime traffic or road traffic, in which various road users or respectively movable objects 20 are moving within a monitoring area of the monitoring system. The monitoring system comprises, in this case, at least one apparatus 1 for ascertaining object kinematics of various movable objects within the monitoring area, as represented in FIG. 1. In this case, the object kinematics of various movable objects can be calculated in real time with very little latency or respectively delay time, so that the reaction time of the traffic monitoring system is low. As a result, collisions between various objects 20 within the monitoring area can, in particular, be reliably and safely avoided. In one possible embodiment, the object kinematics of various movable objects 20 ascertained by the traffic monitoring system are transferred wirelessly by means of a radio interface to the various objects in the monitoring area. In this way, movable objects 20, for example aircraft or road vehicles, are continuously informed about the object kinematics and/or the current trajectory or respectively the current movement direction of other objects located in their proximity and can react accordingly, in particular to avoid collisions.

REFERENCE NUMERALS

1 Apparatus for ascertaining object kinematics
2 Trajectory calculation filter
3 Calculation unit
4 Wire
5 Tracking filter
6 IPDA filter
7 Wire
8 Wire
9 Wire
10 Wire
11 Filter
12 Wire
13 Wire
14 Wire
15 Radar tracking system
16 Radar measurement unit
17 Vehicle
18 Driver assistance system
19 Evaluation unit
20 Target object

The invention claimed is:

1. An apparatus for ascertaining object kinematics of a movable object, comprising:
    a trajectory calculation filter configured to calculate an estimated movement direction of the object based on a predicted position of the object and based on a measured position of the object specified in radar measurement data of the object; and
    a calculation unit configured to calculate Cartesian speeds of the object depending on a measured radial object speed and a measured object angle of the object, which are specified in the radar measurement data of the object, and depending on the estimated movement direction of the object that is calculated in the trajectory calculation filter.

2. The apparatus according to claim 1, further comprising a linear tracking filter configured to calculate a position, a speed and/or an acceleration of the object iteratively depending on the Cartesian speeds that are calculated by the calculation unit, the measured position of the object specified in the radar measurement data, as well as object kinematics predicted for a previous calculation cycle in a prediction filter.

3. The apparatus according to claim 2, further comprising a JPDA filter, which is configured to associate radar data detected by sensors in order to ascertain the radar measurement data of the object, depending on the predicted position and a predicted speed of the object that are iteratively calculated in the prediction filter.

4. The apparatus according to claim 2, further configured to output the position, the speed and/or the acceleration of the object that are calculated in the linear tracking filter, to an evaluation unit of a driver assistance system.

5. The apparatus according to claim 1, wherein the trajectory calculation filter comprises a Kalman filter.

6. The apparatus according to claim 1, wherein the trajectory calculation filter comprises a low-pass filter.

7. A method of ascertaining object kinematics of a movable object, comprising the following steps:
- calculating an estimated movement direction of the object based on a predicted position of the object and based on a measured position of the object specified in radar measurement data of the object detected by sensors; and
- calculating Cartesian speeds of the object depending on a measured radial object speed and a measured object angle of the object, which are specified in the radar measurement data of the object, and depending on the estimated movement direction of the object that is calculated.

8. The method according to claim 7, further comprising iteratively calculating a position, a speed and/or an acceleration of the object depending on the calculated Cartesian speeds, the measured position of the object specified in the radar measurement data, as well as predicted object kinematics.

9. The method according to claim 7, further comprising associating radar data detected by sensors in order to ascertain the radar measurement data of the object, depending on the predicted position and a predicted speed of the object that are iteratively calculated by a prediction filter.

10. The method according to claim 8, further comprising evaluating, in an evaluation unit of a driver assistance system, the position, the speed and/or the acceleration of the object that have been calculated, in order to provide driver assistance functions.

11. A radar tracking system comprising the apparatus according to claim 1 and radar sensors configured to detect the object and produce the radar measurement data.

12. A driver assistance system for a subject vehicle, comprising the apparatus according to claim 2, and an evaluation unit configured to evaluate the position, the speed and/or the acceleration of the object that have been calculated in the apparatus, in order to provide driver assistance functions for a driver of the subject vehicle in real time.

13. The driver assistance system according to claim 12, further configured to calculate a position, a speed and an acceleration of another vehicle or a passer-by located in surroundings of the subject vehicle.

14. The driver assistance system according to claim 13, wherein the subject vehicle comprises an aircraft, a maritime vessel or a land vehicle.

15. A traffic monitoring system for monitoring air traffic, maritime traffic or road traffic of a movable object within a monitoring area, comprising the apparatus according to claim 1 arranged in the monitoring area for ascertaining object kinematics of the movable object in the monitoring area.

* * * * *